United States Patent [19]

Zugel

[11] 3,757,609
[45] Sept. 11, 1973

[54] UNIVERSAL INDEX MECHANISM

[75] Inventor: Martin J. Zugel, Cleveland, Ohio

[73] Assignee: Cyclo Index Corporation, Cleveland, Ohio

[22] Filed: Jan. 10, 1972

[21] Appl. No.: 216,698

[52] U.S. Cl. .............................................. 74/826
[51] Int. Cl. ............................................. B23b 29/32
[58] Field of Search ............... 74/826, 813 L, 813 R

[56] References Cited
UNITED STATES PATENTS

| | | | |
|---|---|---|---|
| 2,975,657 | 3/1961 | Samuel | 74/826 X |
| 3,618,426 | 11/1971 | Fisher | 74/826 X |
| 2,874,595 | 2/1959 | Foster | 74/826 X |
| 3,143,792 | 8/1964 | Swanson et al. | 74/826 X |

Primary Examiner—Charles J. Myhre
Assistant Examiner—F. D. Shoemaker
Attorney—Donald L. Otts

[57] ABSTRACT

A dial plate indexing mechanism having a pair of intermeshing ring gears for providing rigid support and precise index locations. One of the gears is fixed for rotation with the dial plate while the other is supported on plural leaf springs affixed to a base providing rotative rigidity but axial resilience for locking and unlocking purposes. Plural cam rollers engage cam surfaces on the back of the axially movable gear to wedge the latter into locking engagement, such force being derived from a face cam and linkage arrangement driven in timed relation to a worm wheel drive for the dial plate index movement by way of an intermittent drive mechanism.

16 Claims, 6 Drawing Figures

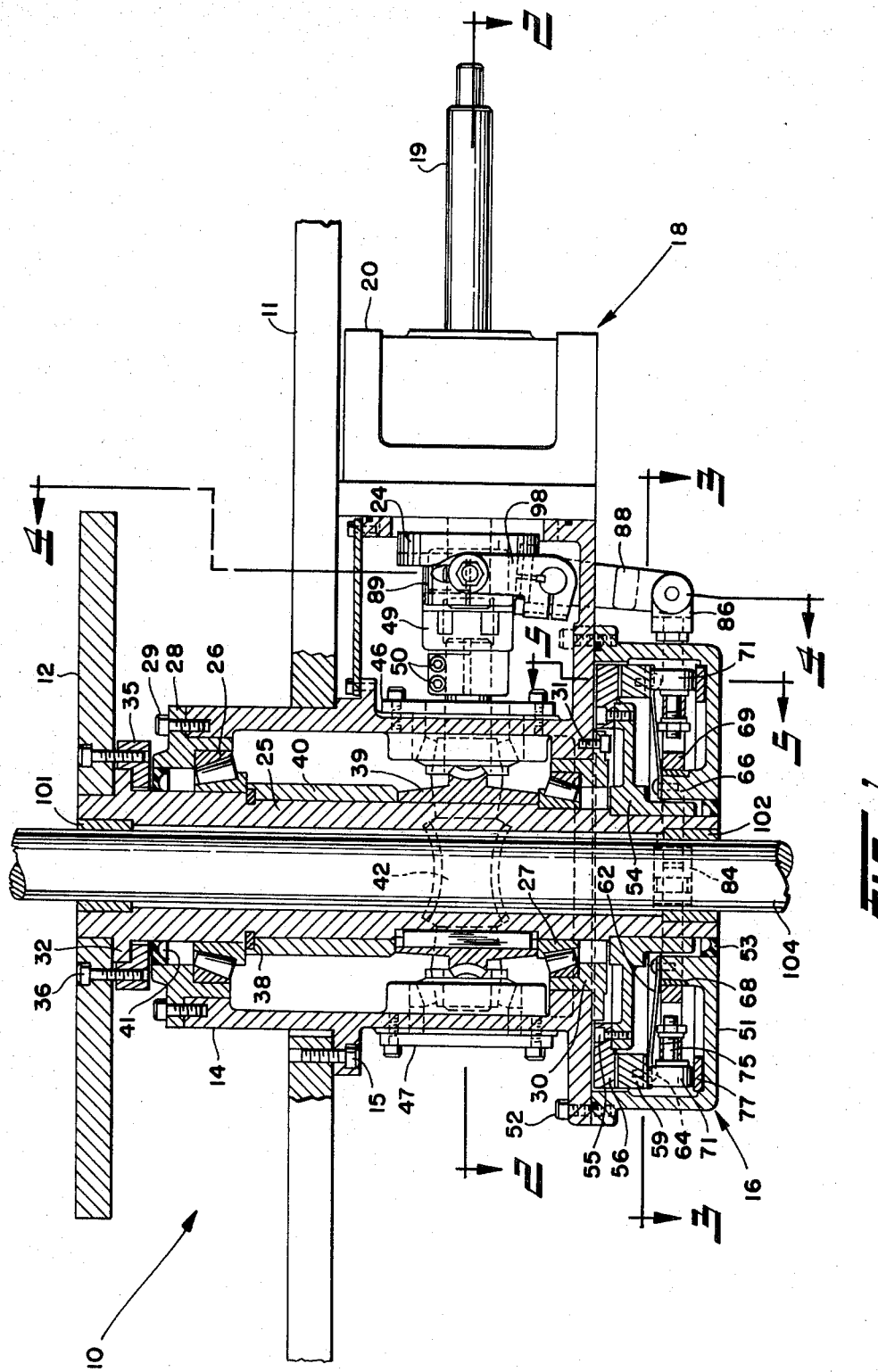

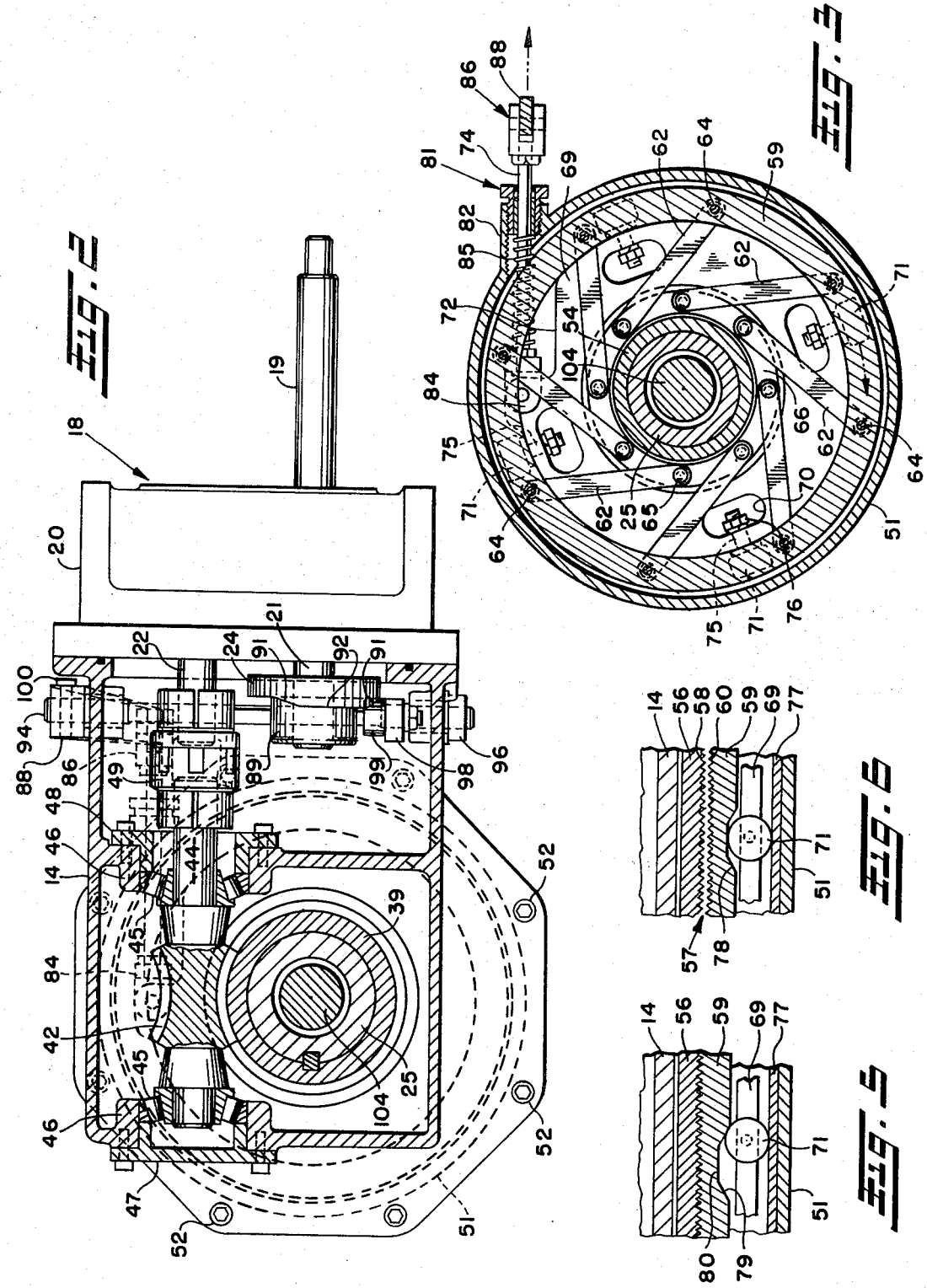

UNIVERSAL INDEX MECHANISM

BACKGROUND OF THE INVENTION

This invention relates ro positioning devices and more particularly to an index mechanism which utilizes a mating ring gear arrangement for establishing precise index positions and for accurately retaining the indexed member in position.

Indexing devices are well established in the art, being used in the positioning of machine tool members and the like and commonplace in material handling apparatus including the index table type of apparatus of the instant invention. While the operating mechanisms may vary to suit the particular application of the indexing apparatus, it is critical in all of these devices to obtain accurate index locations with rapid cycling capability while not jeopardizing the strength of the support or the reliability of the apparatus. Many different forms of mechanisms have been employed to obtain these results, most commonly being achieved by a cam type of operator which might employ the Geneva type of mechanism, the star wheel drive, or the like.

One of the most accurate devices developed to date to achieve precise positioning is that known in the art as the Curvic coupling wherein a pair of face or ring gears are employed, with one movable with the indexable member and the other relatively fixed to the supporting structure and adapted for face to face meshing engagement in the desired index positions. Such type of device provides extreme accuracy for critical machining or positioning operations and is unique in that in use accuracy can actually increase as the teeth on the gears are lapped into further engagement with limits being determined by initial machining and mounting procedures. This type of device is also advantageous in providing a relatively high load bearing capacity and gripping power due to the plural tooth surfaces and relatively wide distribution of load forces.

One of the drawbacks to devices of this type resides in the fact that the gears must be separated in order to perform the indexing movement, inasmuch as one gear is moved with the indexing table or the like, while in the index position relatively firm and solid support must be provided in order to accommodate appreciable machining forces. In prior art devices it is known to affix the respective face gears to the relatively movable and support members, requiring, for example, the lifting of a complete turret structure in order to disengage the gears. Where there is a requirement for sturdy support structures, this introduces high levels of inertia which are not amenable to apparatus designed for high production use where rapid cycling capabilities are essential and further require excessive power reserve.

SUMMARY OF THE INVENTION

Therefore it is one object of this invention to provide an improved form of index table which is capable of precise positioning in the index stations.

It is another object of this invention to provide an improved form of index mechanism which is capable of universal use in providing capability for positioning at a great number of index locations.

It is a still further object of this invention to provide improved indexing apparatus utilizing cooperating ring gears for determining precise index locations with novel apparatus for engaging and disengaging the gears.

It is a still further object of this invention to provide a new form of index table of universal design which is capable of precise positioning and exhibits a high cycling capability, characterized in a novel support arrangement for one of the index determining ring gears and the locking arrangement therefore.

These and other objects of the invention are realized in the apparatus disclosed herein which includes a dial plate supported on a rotatable shaft indexable by a worm and worm wheel drive, carrying for rotation therewith, one of a pair of cooperating ring gears forming a part of the index position determining apparatus. The mating gear is supported for axial movement on the housing in cantilever configuration on plural leaf springs, adapted for locking engagement by means of a roller wedge arrangement and a cam formed on the back surface of the gear. Cam actuation is effected through a linkage coupled to a rotatable face cam with gear disengagement being provided by the bias of the leaf springs. This apparatus is also suited to a further machining procedure or secondary operation related to the timed movement of the index mechanism by means of a centrally disposed axially movable operating rod.

Other objects and advantages of the present invention will become apparant as the following description proceeds.

To the accomplishment of the foregoing and related ends, the invention, then, comprises the features hereinafter fully described, the following description and the annexed drawings setting forth in detail a certain illustrative embodiment of the invention, this being indicative, however of but one of the various ways in which the principles of the invention may be employed.

BRIEF DESCRIPTION OF THE DRAWINGS

FIG. 1 is an elevational view partly in cross-section of the index table of the invention;

FIG. 2 is a sectional view taken along the lines 2—2 of FIG. 1;

FIG. 3 is a sectional view taken along the lines 3—3 of FIG. 1 showing the cam mechanism for the lower ring gear;

FIG. 5 is a sectional view of a portion of the positioning mechanism for the index table showing the cam in the wedging position; and FIG. 6 is a sectional view of the same portion of the positioning mechanism for the index table showing the cam in the unlocked position.

DESCRIPTION OF THE PREFERRED EMBODIMENT OF THE INVENTION

Figure 4:
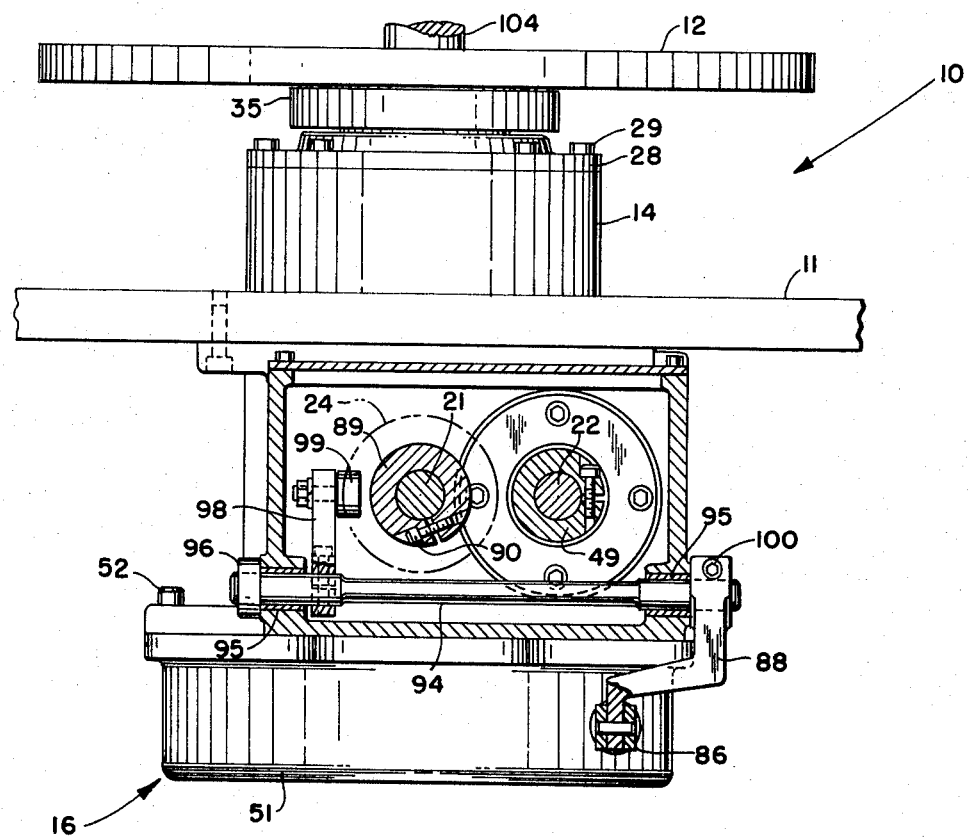
FIG. 4 is an end view partly in cross-section of the index table taken generally along the lines 4—4 of FIG. 1.

Referring now more particularly to the drawings depicting a preferred embodiment of the invention, there is shown the index assembly 10 secured to a table 11 adapted for indexing movement of a dial plate 12 to a plurality of index positions for placement of parts thereon in relation to drilling, milling or similar apparatus (not shown) for machining or like operations. While a dial plate 12 is indicated as the positioned member in the preferred embodiment of the invention, it will be apparent that the mechanism to be described in detail hereinafter is applicable as well to index tables, dividing tables, and in fact any type of mechanism which must be oriented in a plurality of precise locations related to the angular positioning of a rotatable member. Positioning about any axis is possible, although only a vertical axis is depicted in this description.

As seen most clearly in FIG. 1, the assembly 10 is retained in a housing 14 secured to the underside of the table 11 by means of a plurality of bolts 15 and includes generally the dial plate 12, index apparatus 16 for determining precise locations of index for the dial plate 12, and an intermittent motion device indicated generally by the numeral 18, the latter deriving motion from a drive shaft 19. Thus for purposes of description it will be assumed that the drive shaft 19 is rotated at a constant speed by means of a motor or the like coupled thereto to provide intermittent rotary motion to the dial plate 12 about a vertical axis to position parts supported thereon at precise index locations for machining operations and the like, the dial plate 12 remaining at the index station for a period of time sufficient to complete the machining operation preparatory to movement to a succeeding station, such timing being determined by the rate of rotation of the drive shaft 19 and the output characteristics of the intermittent motion device 18.

As seen more clearly in FIG. 2, such intermittent motion device 18 includes a housing 20 which is secured to the index assembly housing 14 for support therewith beneath the table 11 and includes a pair of output shafts 21,22. It may be assumed that the first output shaft 21 is continuously rotatable at a rate related to that of the drive shaft 19, determined by spur gearing or the like, while the second output shaft 22 is intermittently rotatable, the degree and speed of rotation being related to the rotation of the first output shaft 21 by a Geneva drive mechanism or the like coupled therebetween. As will be described in more detail hereinafter, the first output shaft 21 supports a cylindrical cam 24 and provides the locking and unlocking function for the index apparatus 16 while the second output shaft 22 is mechanically coupled to the dial plate 12 to provide indexing movement thereto for an approximate determination of the desired index location.

A dial plate shaft 25 is substantially vertically oriented within the housing 14 and is journalled for rotation on upper and lower roller bearings 26, 27 retained respectively in an upper annular bearing support 28 secured at the upper end of the housing 14 by means of bolts 29, and a lower annular bearing mount 30 secured at the bottom end of the housing by means of bolts 31.

The dial plate shaft 25 is generally of hollow cylindrical configuration and includes a flange 32 adjacent the upper end thereof on which the dial plate 12 is mounted and secured by means of a ring clamp 35 received beneath the flange 32 and attached to the dial plate 12 by means of recessed bolts 36.

The upper bearings 26 are retained on the shaft 25 by means of s snap ring 38, and a worm wheel gear 39, for imparting rotation to the shaft, is secured thereon by means of a key or the like adjacent the lower bearings 27, the shaft 25 further supporting a tubular spacer 40 located between the worm wheel hub and the inner race of the upper bearings 26. A shaft seal 41 is fitted at the upper portion of the housing 14 to prevent the entrance of contaminants.

As seen most clearly in FIG. 2, the drive for moving the dial plate 12 comprises a worm 42 supported on a shaft 44 journalled in a pair of bearings 45 supported on bosses 46 extending transversely of the housing 14, a cover plate 47 and bearing retaining plate 48 being secured thereto for retaining the drive mechanism. The shaft 44 is connected to the second output shaft 22 of the intermittent motion device 18 by a spline coupling 49 which includes clamping screws 50 thereon for adjustment of the relative position of the shaft 44 with respect to the output shaft 22. Thus rotation of the shaft 44 and worm 42 therewith in engagement with worm wheel 39 causes rotation of dial shaft 25 and dial plate 12 therewith, and the end position of the latter can be adjusted by loosening screws 50 to shift the relationship between shaft 44 and the second output shaft 22 of the intermittent motion device.

A lower housing 51 of cup-like configuration is secured by means of bolts 52 to the bottom of the main housing 14 for retaining the index apparatus 16. The dial shaft 25 extends into an aperture central of the housing 51 inside lower seal 53. Further mounted on the dial shaft 25 for rotation therewith is a hub 54 which supports at the periphery thereof by means of bolts 55 an upper ring gear 56 which forms one part of the Curvic coupling 57. Ring gear 56 is annular in configuration and includes a plurality of circumferentially spaced axially extending, downwardly oriented teeth 58 on the periphery thereof and is adapted for rotation together with the dial plate 12 by means of the dial shaft 25.

The mating portion of the coupling 57 comprises a lower ring gear 59 having mating teeth 60 adapted for meshing engagement with the teeth 58 of the upper ring gear 56 fully about the periphery thereof to provide an exact location for the dial plate 12 with respect to the table 11 and support therefor against rotation from such position.

As seen most clearly in FIG. 3, such lower ring gear 59 is resiliently supported in the lower housing 51 for movement in an axial direction by means of eight leaf springs 62 which are equally spaced about the periphery of the ring gear 59 and attached at one end thereto by means of eight bolts 64 and attached at the other end by a similar number of bolts 65 threaded into an annular boss 66 extending into the lower housing 51 adjacent the dial shaft 25. The leaf springs 62 are longer than the radial distance between the boss 66 and the lower ring gear 59 and are disposed therebetween angularly rather than in a radial direction so as to provide a rigid rotative support for the ring gear 59 while allowing axial movement. Thus any rotative force exerted on the lower ring gear 59 through the dial shaft 25 acts in the direction to rotate the leaf springs 62 about the respective pivot points located on the boss 66 in a direction other than tangentially to the allowable path of movemt of the leaf springs 62, such force acting about the periphery of the ring gear 59 and being equalized by the oppositely disposed leaf springs 62. Preferably the configuration of the leaf springs 62 is such as to bias the lower ring gear 59 out of engagement with the upper ring gear 56 even without the gravitational force acting thereon so as to assure a complete and reliable disengagement of the gears when indexing movement of the dial plate 12 is desired.

The boss 66 of the lower housing 51 is machined at its periphery and receives thereon a sleeve bearing 68 for support of an actuator ring 69 which effects the engagement and disengagement of the ring gears 56, 59. The actuator ring 69 is an annular plate having apertures 70 at four equidistant locations thereabout for mounting of the cam rollers 71 and includes a relief 72 at one point about the periphery to provide clearance for attachment of an actuator rod 74. The rollers 71 are mounted on stub shafts 75 radially disposed in the actuator ring 69 and secured by means of nuts 76 in the apertures 70 therein and are adapted to roll upon a wear plate 77 which is also of ring configuration secured at the inner periphery of the bottom housing 51.

The lower face of the lower ring gear 59 includes four relieved cam surfaces 78 therein associated with the respective rollers 71 carried by the actuator ring 69 and seen most clearly in FIGS. 5 and 6 as comprising a pair of ramps 79 with a flat section 80 intermediate therebetween.

The actuator ring 69 is capable of limited rotation about the boss 66, such movement being provided by the actuator rod 74 which is journalled in an adjustable bushing assembly 81 threaded into a boss 82 formed on the periphery of the lower housing 51 and connected to the actuator ring 69 by means of a clevis and pin assembly 84. A spring 85 is received on the rod 74 in abutment with the clevis assembly 84 and adjustable bushing assembly 81 to exert a bias against the actuator ring 69 in a direction to move the cam rollers 71 into the flat section 80 of the cam surfaces 78 for disengagement of the lock mechanism.

The actuator rod 74 includes a clevis 86 at the opposite end and is pivotally connected to a lever arm 88 as seen most clearly in FIG. 4 forming a part of the mechanism for transforming motion from the face cam 24 supported on the first output shaft 21 of the intermittent motion device 18 to the actuator ring 69. The face cam 24 is of cylindrical configuration adjustably mounted on the output shaft 21 by means of a split collar 89 and locking bolts 90 and the cam surface is configured to include a pair of ramps 91, each extending over angles of approximately 30° and a central dwell section 92 intermediate the ramps 91 which extends for an angle of approximately 70°.

A pivot shaft 94 extending across the housing 14 and supported for rotation in bushings 95 is secured in place by means of a shaft collar 96 and supports thereon a cam lever 98 which in turn rotatably supports the cam roller 99 for cooperation with the face cam 24. The lever arm 88 is fixed for movement with the pivot shaft 94 by means of clamp screw 100.

The index assembly 10 is depicted in FIGS. 2 and 6 in the unactuated or unlocked condition with the locking cam rollers 71 in abutment with the relieved flat section 80 of the cam surace 78. surface this time the actuator rod 74 is biased to the left as viewed in FIG. 3 under influence of the springs 85 biasing therewith the actuator ring 69 and rollers 71. This condition allows the lower ring gear 59 to assume the lower position depicted in FIG. 6, i.e. out of engagement with an upper ring gear 56, under the influence of gravity and the bias of the leaf springs 62.

While in this condition the second output shaft 22 of the intermittent motion device 18 may be rotated to position the dial plate 12 at an approximate index location by means of the worm 42 and worm wheel 39, such quantity of motion being determined by the gearing or cam arrangement of the intermittent motion device 18, with the latter being sufficiently accurate to locate the dial plate 12 and thus the upper ring gear 56 within one tooth of the desired index station.

In the preferred embodiment of the invention each of the ring gears includes 240 teeth thereon providing a wide capability for selection of index locations in equal angular spacing and, for example, a Geneva type drive coupled to the second output shaft 22 and driven in relation the first output shaft 21 would provide sufficient accuracy to determine such index locations. It will be evident that various gear ratios may be employed in the intermittent motion device 18 to provide any desired degree of rotation to the second output shaft 22 thereof for applied input from the drive shaft 19 and the ratio of the worm and worm wheel drive may be similarly varied for selection of indexing increments. Such indexing movement occurs during the idle period of the face cam 24, i.e. the approximately 230° of rotation that the lower ring gear 59 remains fully clear from the upper ring gear 56.

Once the dial plate 12 has reached the index station, continued rotation of the face cam 24 will bring the ramp 91 and eventually the dwell surface 92 into engagement with the cam roller 99 causing a counterclockwise movement of same as viewed in FIG. 1 and thus a clockwise rotation of the actuator ring 69 as viewed in FIG. 3 by virtue of the coupling through the actuator rod 74 and cam shaft 94. Such movement is evidenced in FIG. 5 as movement of the actuator ring 69 toward the right from the position shown in FIG. 6 causing engagement of the rollers 71 with the ramp portion 79 of the ramp surface 80 on the lower ring gear 59 urging the latter upward and into engagement with the upper ring gear 56. The meshing of the ring gears 56, 59 will cause a final accurate positioning of the dial plate 12, sufficient resilience being afforded in the worm screw drive to accommodate such movement.

When the cam roller 99 reaches the dwell surface 92 of the face cam 24, the rollers 71 are firmly wedged between the ramps 79 of the lower ring gear 59 and the wear plate 77 firmly forcing the lower ring gear 59 upward into engagement with the upper ring gear 56. During this dwell interval machining may be performed upon the part or parts carried by the dial plate 12 at one or more index stations and firm support will be provided thereby. It will be apparent that rather than have the first output shaft 21 of the intermittent motion device 18 continuously rotatable, such latter device might be selected to provide intermittent rotation also to the first input shaft 21 to allow sufficient time for machining purposes, the only requirement being that the timing relationship be maintained between the output shafts 21, 22 to assure proper unlocking and locking of the index mechanism relative to the indexing movement of same.

In this embodiment of the invention, the dial shaft 25 is hollow and supports therein on upper and lower bronze bearings 101, 102, a vertically disposed actuator rod 104 which provides access to the upper surface of the dial plate 12 from beneath the table 11. Rod 104 is axially and rotatively movable and may be used to perform a clamping, machining or positioning function for parts supported on the dial plate 12 or may be integrated with external machining devices. Further, the rod 104 can be coupled with the intermittent motion device 18 to provide actuation in predetermined relation to the index movement of the dial plate 12.

The embodiments of the invention in which an exclusive property or privilege is claimed are defined as follows:

1. Apparatus for positioning a member at precise angular locations comprising support means, means mounting said member for angular movement with respect to said support means, a first gear affixed to said member for movement therewith, a second gear adapted for face to face meshing engagement with said first gear for establishing precise angular locations, mounting means for mounting said second gear on said support means for movement toward and away from said first gear while preventing angular movement of said second gear relative to said support means, and means for urging said second gear into meshing engagement with said first gear to fix the latter relative to said support means, said mounting means comprising plural leaf springs mounted between said second gear and said support means, said springs being adapted for longitudinal flexure and biased to urge said second gear out of engagement with said first gear.

2. Apparatus as set forth in claim 1 further comprising means for indexing said member when said second gear is out of engagement with said first gear, and drive means for alternatively driving said indexing means and said means for urging said second gear into meshing engagement with said first gear, whereby said second gear is moved out of and into engagement with said first gear prior to and subsequent to actuation of said indexing means, respectively.

3. Apparatus for positioning a member at precise angular locations comprising support means, means mounting said member for angular movement with respect to said support means, a first gear affixed to said member for movement therewith, a second gear adapted for face to face meshing engagement with said first gear for establishing precise angular locations, mounting means for mounting said second gear on said support means for movement toward and away from said first gear while preventing angular movement of said second gear relative to said support means, and means for urging said second gear into meshing engagement with said first gear to fix the latter relative to said support means, said second gear having a cam surface on the rear face thereof, and said means for urging said second gear into meshing engagement with said first gear comprising cam rollers mounted between said rear face of said second gear and said support means, and means for moving said cam rollers relative to said cam surface to urge said second gear into engagement with said first gear.

4. Apparatus as set forth in claim 3 wherein said first and second gears each comprise a ring gear having axially projecting teeth spaced about the circumference thereof.

5. Index apparatus comprising a housing, a shaft rotatably supported in said housing, a member fixed to said shaft for rotation therewith to index stations, means for rotating said shaft for positioning said member at approximate index stations, a first ring gear fixed to said shaft for rotation therewith, a second ring gear adapted to mate with said first ring gear, mounting means for mounting said second ring gear in said housing for movement into and out of engagement with said first ring gear to determine precise index stations for said member, said mounting means securing said second ring gear against rotative movement relative to said housing, and camming means for camming said second ring gear into engagement with said first ring gear for locking said member in the index station.

6. Apparatus as set forth in claim 5 wherein said shaft is hollow, further including a rod journalled in said shaft for movement relative thereto and for access to said member.

7. Apparatus as set forth in claim 5 wherein said mounting means comprises spring means disposed between said housing and said second ring gear, said spring means adapted to bias said second ring gear out of engagement with said first ring gear.

8. Apparatus as set forth in claim 7 wherein said spring means comprises plural leaf springs disposed about the circumference of said second ring gear.

9. Apparatus as set forth in claim 8 wherein said housing includes an annular boss therein, said leaf springs being mounted at one end on said boss and at the other end on said second ring gear and being of a length greater than the radial distance between said boss and said second ring gear.

10. Apparatus as set forth in claim 8 wherein said leaf springs are mounted between said housing and said second ring gear and inwardly of the latter, being angularly disposed relative to the radial path therebetween.

11. Apparatus as set forth in claim 5 wherein said second ring gear has a cam surface on the face thereof and said camming means comprises cam rollers disposed between said second ring gear and said housing for cooperation with said cam surface and means for moving said cam rollers relative to said cam surface for engaging said ring gears.

12. Apparatus as set forth in claim 11 wherein said camming means further comprises a roller support plate, means for rotatively supporting said roller support plate in said housing, said cam rollers being disposed at the periphery thereof, and means for rotating said support plate to move said cam rollers relative to said cam surface.

13. Apparatus as set forth in claim 12 wherein said means for rotatively supporting said roller support plate comprises a cam and roller assembly, linkage coupling said roller to said support plate and an intermittent motion device for imparting rotation to said cam and roller assembly.

14. Apparatus as set forth in claim 13 wherein said means for rotating said shaft comprises gearing interconnecting said shaft and said intermittent motion device for imparting a predetermined angle of rotation to said member.

15. Apparatus as set forth in claim 17 wherein said gearing comprises a worm and worm wheel drive supported in said housing and further including means for adjusting the angular relationship between said worm and worm wheel drive and said intermittent motion device.

16. Apparatus as set forth in claim 15 wherein said intermittent motion device includes means for imparting intermittent motion to said worm and worm wheel drive relative to the motion imparted to said cam and roller assembly.

* * * * *